(12) United States Patent
Udo et al.

(10) Patent No.: US 6,914,631 B2
(45) Date of Patent: Jul. 5, 2005

(54) IMAGE SENSOR (75) Inventors: Shinya Udo, Kawasaki (JP); Masatoshi Kokubun, Kawasaki (JP); Chikara Tsuchiya, Kawaski (JP); Katsuyosi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 640 days.

(21) Appl. No.: 10/042,240

(22) Filed: Jan. 11, 2002

(65) Prior Publication Data
US 2002/0158974 A1 Oct. 31, 2002

(30) Foreign Application Priority Data
Apr. 26, 2001 (JP) ........................................ 2001-130148

(51) Int. Cl.[7] .............................................. H04N 5/335
(52) U.S. Cl. ...................................... 348/301; 348/308
(58) Field of Search ............................ 348/207.99, 300, 348/301, 302, 308, 310; 377/60; 250/208.1

(56) References Cited

U.S. PATENT DOCUMENTS

| | | | |
|---|---|---|---|
| 6,128,039 A | 10/2000 | Chen et al. | |
| 6,243,434 B1 * | 6/2001 | Hynecek | ..................... 377/60 |
| 6,339,363 B1 | 1/2002 | Fowler | |
| 6,424,375 B1 | 7/2002 | Fowler | |
| 6,459,078 B1 | 10/2002 | Fowler | |
| 6,493,030 B1 * | 12/2002 | Kozlowski et al. | ......... 348/310 |
| 2002/0036700 A1 * | 3/2002 | Merrill | ....................... 348/308 |

FOREIGN PATENT DOCUMENTS

| | | |
|---|---|---|
| EP | 0 796 000 A2 | 9/1997 |
| EP | 0 813 338 A2 | 12/1997 |
| JP | 2000-078472 | 3/2000 |

OTHER PUBLICATIONS

International Publication No. WO 99/53683, published Oct. 21, 1999.

* cited by examiner

*Primary Examiner*—Tuan Ho
(74) *Attorney, Agent, or Firm*—Arent Fox (57) ABSTRACT

The invention relates to an X-Y address type solid-state image pickup device manufactured by a CMOS process, and has an object to provide an X-Y address type solid-state image pickup device which has a small element size and a wide opening ratio, and can reduce a kTC noise. A photodiode 10, a reset transistor 12, a source follower amplifier 14, and a horizontal selection transistor 16 are formed in each of pixel regions Pmn. A kTC noise reduction circuit 6VR1 for reducing a kTC noise and a CDS circuit 6CL1 are formed outside of the pixel regions Pmn. A differential amplifier is constituted by a first differential transistor 62 of the kTC noise reduction circuit 6VR1 and the source follower amplifier 14 in each of the pixel regions Pmn.

9 Claims, 5 Drawing Sheets

PRIOR ART

FIG.8

IMAGE SENSOR

BACKGROUND OF THE INVENTION

1. Field of the Invention

The present invention relates to a solid-state image pickup device constituted by semiconductor elements, and particularly to an X-Y address type solid-state image pickup device manufactured by a CMOS process.

2. Description of the Related Art

In recent years, solid-state image pickup devices are incorporated in various products, such as digital still cameras, digital video cameras, or portable telephones, and are used in large quantities. The solid-state image pickup device is roughly classified into a CCD (Charge Coupled Device) solid-state image pickup device constituted by a charge transfer image sensor, and an X-Y address type solid-state image pickup device in which an image sensor is constituted by, for example, CMOS (Complementary Metal Oxide Semiconductor) transistors. The X-Y address type solid-state image pickup device using a CMOS image sensor (hereinafter suitably abbreviated to a CMOS image sensor) can be manufactured by the same technique as a manufacturing process of a MOSFET, and it is driven by a single power source and consumed electric power is also low, and further, various signal processing circuits can be mounted on the same chip. Thus, the CMOS image sensor is regarded as promising in substitution for the CCD solid-state image pickup device.

Figure 6:
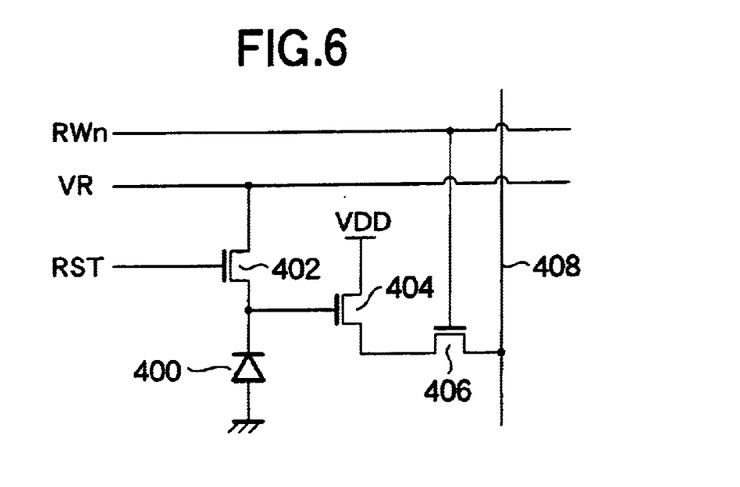
FIG. 6 is a view showing a conventional X-Y address type solid-state image pickup device using a CMOS image sensor.

A conventional X-Y address type solid-state image pickup device using this CMOS image sensor will be described with reference to FIG. 6. FIG. 6 shows a circuit example of one pixel of the conventional X-Y address type image sensor. The conventional CMOS image sensor shown in FIG. 6 has, for example, an APS (Active Pixel Sensor) structure in which a source follower amplifier 404 is mounted in each pixel. A cathode side of a photodiode 400 is connected to a gate electrode of the source follower amplifier 404 and a MOS type reset transistor 402. Besides, the source follower amplifier 404 is connected to a vertical selection line 408 through a horizontal selection transistor 406.

The operation of this conventional CMOS image sensor will be described in brief. First, a reset signal RST is applied to a gate electrode of the reset transistor 402 at a predetermined timing so that the reset transistor 402 is turned on. By this, the photodiode 400 is charged to a reset potential VR. Next, with the incidence of light, the photodiode 400 starts to discharge and the potential is lowered from the reset potential VR. An incident photon during an integration period is subjected to photoelectric conversion to generate a pair of an electron and a hole. The electron is stored in the photodiode in a floating state, and the hole is absorbed by a semiconductor substrate biased to the ground. When a signal electric charge is Qsig, a potential change $\Delta$VPD of the photodiode 400 by a signal electron is given by $\Delta$VPD=Qsig/Cs. When a horizontal selection signal RWn is inputted to a gate electrode of the horizontal selection transistor 406 after a predetermined time has elapsed and the horizontal selection transistor 406 is turned on, a voltage of the source follower amplifier 404 is extracted as a signal voltage through the vertical selection line 408.

However, in the conventional APS structure in which the charge storage capacitance photodiode 400 and the source follower amplifier 404 are mounted, there is a problem that a fixed pattern noise (FPN) in which a DC level of a signal voltage is changed by fluctuation of a threshold voltage VT or the like, is generated and picture quality is deteriorated. In order to reduce this, a correlated double sampling (CDS) circuit is used. First, after a signal voltage is sampled by the correlated double sampling circuit, the photodiode 400 is reset to the reset potential VR. Next, the reset voltage is sampled by the correlated double sampling circuit, and a difference between the signal voltage and the reset voltage is obtained. By this, the influence of the fluctuation of the threshold voltage VT is compensated and the FPN can be reduced.

However, in this method, since the reset voltage after signal storage, not the reset voltage before the signal storage (integration), is sampled to obtain the difference between the reset voltage and the signal voltage, there is no correlation between a kTC noise (thermal noise) superimposed on the signal voltage and a kTC noise superimposed on the sampled reset voltage. Thus, there remains a problem that the kTC noise generated at random from the photodiode 400 in a reset period can not be removed by the CDS circuit, and the S/N ratio is deteriorated as compared with the CCD solid-state image pickup device.

The kTC noise is generated when the reset transistor 402 is brought into an on state and the photodiode 400 is reset to the initial potential, and is a random noise expressed by $\sqrt{kTC}=(kT/C)^{1/2}$. Where, k is the Boltzman constant, T is absolute temperature, and C is total capacitance stored in the photodiode 400.

Figure 7:
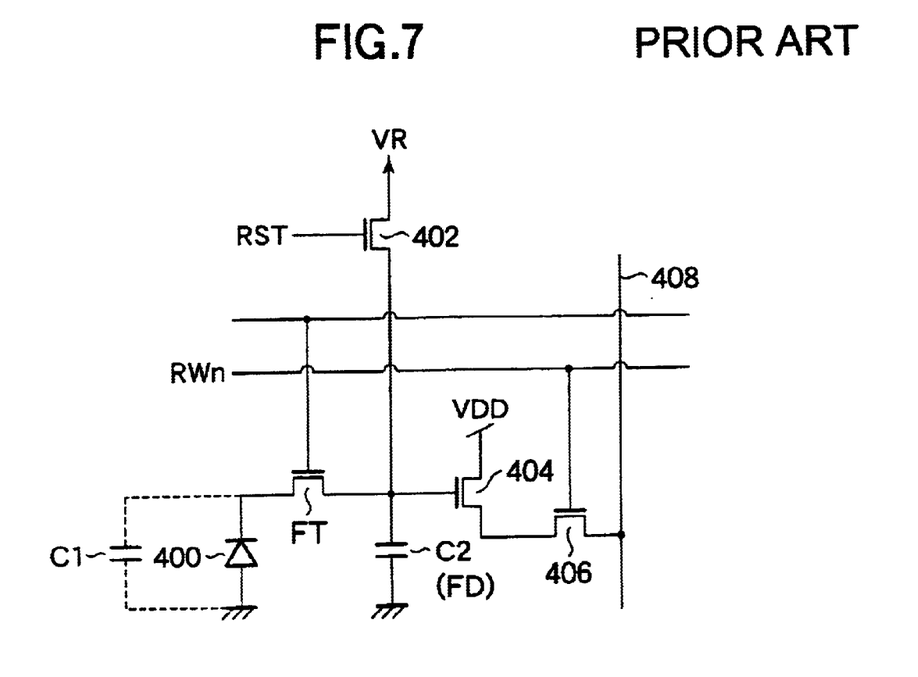
FIG. 7 is a view showing another example of a conventional X-Y address type solid-state image pickup device using a CMOS image sensor.

Next, a CMOS image sensor capable of reducing the kTC noise will be described with reference to FIG. 7. In FIG. 7, a transfer gate FT for forming an energy barrier is provided between a first capacitance C1 of a photodiode 400 and a second capacitance C2 of a floating diffusion (FD) region, and a source follower amplifier 404 is connected between the transfer gate FT and a horizontal selection transistor 406 constituted by a MOSFET. A MOS type reset transistor 402 for removing an electric charge stored in the second capacitance C2 is connected to the second capacitance C2. A drain electrode of the source follower amplifier 404 is connected to a power source VDD, and its source electrode is connected to the horizontal selection transistor 406. A gate electrode of the source follower amplifier 404 is connected to the second capacitance C2. A reset potential VR is applied to a drain electrode of the reset transistor 402. A source electrode of the reset transistor 402 is connected to the second capacitance C2, and a reset signal RST is inputted to its gate electrode.

When an electric charge is transferred to the second capacitance C2 of the FD region by turning on the transfer gate FT after the electric charge is stored in the first capacitance C1, the potential of the gate of the source follower amplifier 404 becomes gradually high. When the horizontal selection transistor 406 is turned on after a predetermined time has elapsed, the source voltage of the source follower amplifier 404 is outputted through a vertical selection line 408, and an electric charge quantity Q stored in the second capacitance C2 can be detected. When the reset transistor 402 is turned on only once before the transfer gate FT is turned on, all electric charge stored in the second capacitance C2 can be removed, and deterioration of picture quality due to a residual electric charge can be suppressed.

According to this structure, since the signal voltage after resetting can be sampled after the reset voltage prior to the signal storage is sampled, the kTC noises respectively superimposed on the reset voltage and the signal voltage have high correlation. Thus, when the signal voltage is sampled after the reset voltage is sampled and the difference between the reset voltage and the signal voltage is obtained by using the correlation double sampling circuit, the kTC noise of the signal voltage can be reduced.

However, in the structure of the conventional CMOS image sensor shown in FIG. 7, as described above, although the FPN and the kTC noise can be reduced, there is a problem that the element structure becomes complicated. The element structure of the pixel shown in FIG. 7 has a problem that as compared with the element structure of the pixel shown in FIG. 6, the number of the transistors is increased, the pixel portion becomes complicated, and the opening ratio (fill factor) of a light receiving portion is lowered.

Figure 8:
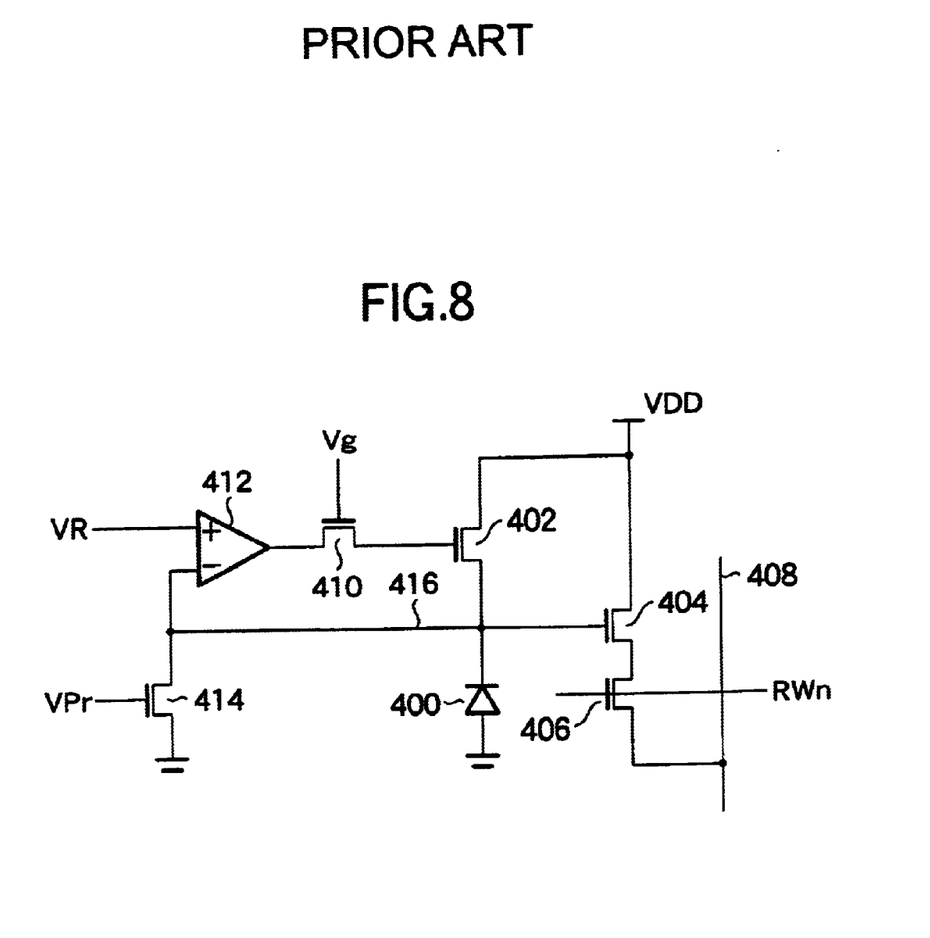
FIG. 8 is a view showing still another example of a conventional X-Y address type solid-state image pickup device using a CMOS image sensor.

Next, another example of a CMOS image sensor capable of reducing the kTC noise will be described with reference to FIG. 8. The CMOS image sensor shown in FIG. 8 includes a control circuit for controlling a reset voltage applied to a gate electrode of a reset transistor 402 to reduce the kTC noise, in addition to the element structure shown in FIG. 6.

A reference reset signal VR is inputted to a non-inverting input terminal of an operational amplifier 412 of the control circuit. A signal at a connection point between a cathode terminal of the photodiode 400 and the reset transistor 402 is inputted through a wiring line 416 to an inverting input terminal of the operational amplifier 412. The wiring line 416 is arranged in a pixel region. Besides, a constant current source 414 is connected to the inverting input terminal of the operational amplifier 412. An output terminal of the operational amplifier 412 is connected to the gate electrode of the reset transistor 402 through a switch circuit 410.

In the control circuit of such structure, when a signal Vg is inputted to a gate electrode of the switch circuit 410 at a predetermined reset timing and the switch circuit 410 is turned on, a gate voltage of the reset transistor 402 is controlled so that a potential at the cathode side of the photodiode 400 always becomes the reset voltage VR. By doing so, the kTC noises respectively superimposed on the signal voltage and the subsequent reset signal after signal storage can be made to have an almost constant level. Thus, when the reset signal after the signal storage is sampled and a difference between the sampled voltage and the signal voltage is obtained by a CDS circuit, the kTC noise can be reduced. However, in this structure, since it becomes necessary to arrange the wiring line 416 in the pixel region, there arises a problem that an opening ratio is not made wide.

As described above, the CMOS image sensor shown in FIG. 6 has the problem that the kTC noise can not be reduced. On the other hand, the CMOS image sensors shown in FIGS. 7 and 8 have the problem that in exchange for reduction of the kTC noise, the element size becomes large and a wide opening ratio can not be obtained.

SUMMARY OF THE INVENTION

An object of the present invention is to provide an X-Y address type solid-state image pickup device which has a small element size and a wide opening ratio, and can reduce the kTC noise.

The above object can be achieved by an X-Y address type solid-state image pickup device characterized by comprising a pixel region including a photoelectric transducer for performing photoelectric conversion of incident light, a reset transistor for resetting the photoelectric transducer, an amplifying transistor for converting an electric charge stored in the photoelectric transducer into a voltage, and a horizontal selection transistor for outputting the voltage as image data to a vertical selection line on the basis of a horizontal selection signal outputted to a horizontal line, and a kTC noise reduction circuit for reducing a kTC noise generated at a time of the resetting.

DETAILED DESCRIPTION OF THE PREFERRED EMBODIMENTS

Figure 1:
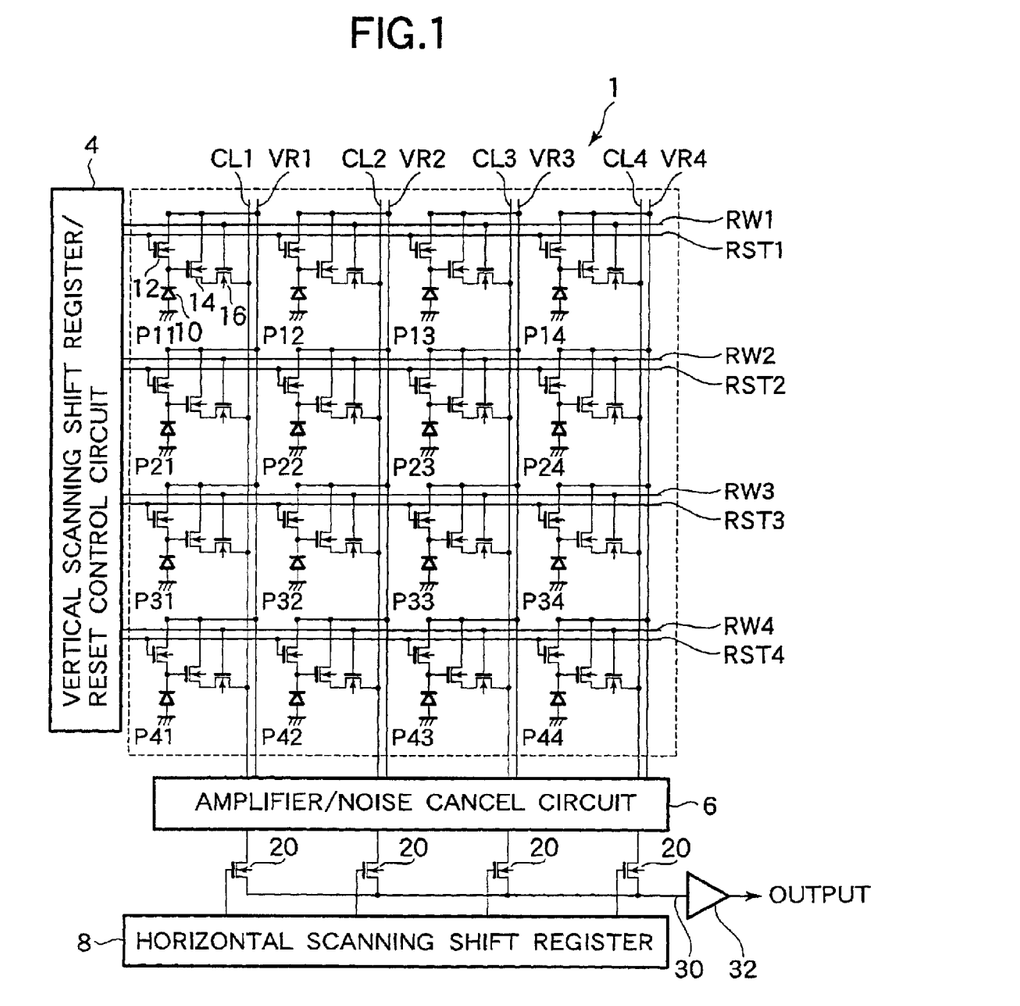
FIG. 1 is a view showing a circuit example of 4×4 pixels of a CMOS image sensor 1 according to an embodiment of the present invention.

An X-Y address type solid-state image pickup device according to an embodiment of the present invention will be described with reference to FIGS. 1 to 5. First, a rough structure of a CMOS image sensor as the X-Y address type solid-state image pickup device according to the embodiment will be described with reference to FIG. 1. FIG. 1 shows a circuit example of 4×4 pixels of a CMOS image sensor 1 including a pixel array of m rows and n columns. A plurality of pixel regions P11 to P44 are arranged in a matrix form, and a plurality of vertical selection lines CL1 to CL4 and a plurality of horizontal selection lines RW1 to RW4 are arranged vertically and horizontally. A photodiode 10 as a photoelectric transducer is formed in each of the pixel regions P11 to P44. As the photoelectric transducer, for example, a photo gate may be used instead of the photodiode 10.

The CMOS image sensor 1 has an APS structure in which a source follower amplifier 14 constituted by, for example, a MOSFET (in this embodiment, an n-ch (n-channel) MOSFET is exemplified), a horizontal selection transistor 16, and the like are arranged in each of the pixel regions P11 to P44.

Hereinafter, a row number is made m, a column number is made n, and a circuit structure of a pixel region Pmn will be described. A cathode side of the photodiode 10 in the pixel region Pmn is connected to a source electrode of a reset transistor 12 of, for example, an n-ch MOSFET and a gate electrode of the source follower amplifier 14.

A drain electrode of the reset transistor 12 and a drain electrode of the source follower amplifier 14 are connected to a reset voltage supply line VRn to which a reset voltage VR is applied. A gate electrode of the reset transistor 12 is connected to a reset signal line RSTm. A source electrode of the source follower amplifier 14 is connected to a drain electrode of the horizontal selection transistor 16 of, for example, an n-ch MOSFET. A gate electrode of the horizontal selection transistor 16 is connected to the horizontal selection line RWm to which a horizontal selection signal RW is supplied. A source electrode of the horizontal selection transistor 16 is connected to the vertical selection line CLn.

The horizontal selection line RWm is connected to a vertical scanning shift register/reset control circuit 4. The horizontal selection signal RW is successively outputted to the horizontal selection line RWm at a predetermined timing by a not-shown shift register provided in the vertical scanning shift register/reset control circuit 4. The reset signal line RSTm is also connected to the vertical scanning shift register/reset control circuit 4, and the reset signal RST is applied to the reset transistor 12 of the pixel region Pmn at a predetermined timing for each horizontal selection line RWm.

The reset voltage supply line VRn is arranged almost parallel to the vertical selection line CLn, and together with the vertical selection line CLn, is connected to an amplifier/noise cancel circuit 6.

The vertical selection line CLn is connected to a signal common output line 30 through a CDS circuit 6CLn provided in the amplifier/noise cancel circuit 6 and a column selection transistor 20 constituted by, for example, an n-ch MOSFET. A structure of the CDS circuit 6CLn in the amplifier/noise cancel circuit 6 will be described later with reference to FIG. 2.

The reset voltage supply line VRn is connected to a kTC noise reduction circuit 6VRn a circuit main portion of which is provided in the amplifier/noise cancel circuit 6. A structure of the kTC noise reduction circuit 6VRn will be described later with reference to FIG. 3.

A column selection signal is successively inputted to gate electrodes of the plurality of column selection transistors 20 from a horizontal scanning shift register 8 at a predetermined timing, and image data in which a fixed pattern noise and a kTC noise are removed by the amplifier/noise cancel circuit 6 is successively outputted to the signal common output line 30 and is transmitted to an external system through an amplifier 32.

Next, the operation of the CMOS image sensor 1 will be described in brief. First, when the reset transistor 12 is turned on at the predetermined timing by the reset signal RST, the photodiode 10 is charged to the reset potential VR. Next, with the incidence of light, the photodiode 10 starts to discharge, and the potential is lowered from the reset potential VR. When the horizontal selection signal RW is outputted to the horizontal selection line RWm after a predetermined time has elapsed, the horizontal selection signal RW is inputted to the gate electrode of the horizontal selection transistor 16 connected to the horizontal selection line RWm, and the horizontal selection transistor 16 is turned on. By this, the output voltage from the source follower amplifier 14 is outputted as the image data of the pixel region Pmn to the vertical selection line CLn.

Figure 2:
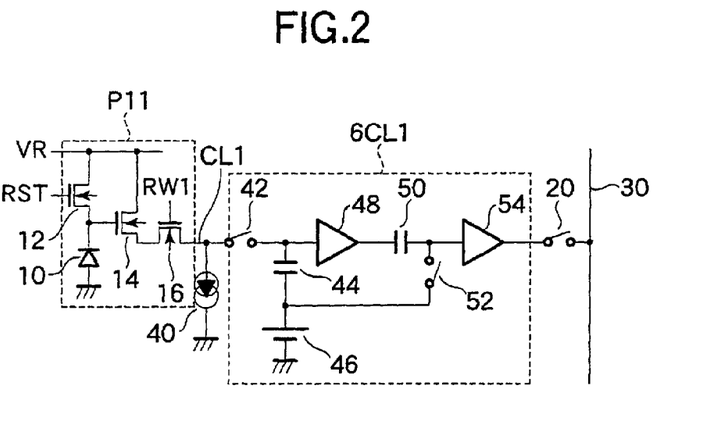
FIG. 2 is a view showing a circuit example of a sample-and-hold circuit and a correlated double sampling circuit of the CMOS image sensor 1 according to the embodiment of the present invention.

Next, the structure of the amplifier/noise cancel circuit 6 will be described. The amplifier/noise cancel circuit 6 includes, as shown in FIG. 2, a sample-and-hold circuit connected to the vertical selection line CL1 and a correlated double sampling circuit. In FIG. 2, a block indicated by a dotted line at the left side in the drawing shows the pixel region P11 at the upper left of FIG. 1 as an example of the plurality of pixels connected to the vertical selection line CL1. A block indicated by a dotted line at the right side in the drawing shows the sample-and-hold circuit and the correlated double sampling circuit.

The sample-and-hold circuit is provided with a sample-holding switch 42 for controlling the input of a signal outputted to the vertical selection line CL1. A constant current source 40 is connected to a connection point between an input side of the sample-holding switch 42 and the vertical selection line CL1. One electrode side (hereinafter, with respect to two electrodes constituting a capacitance, and two electrodes of a transistor except for a gate electrode, if necessary, one of them is called one electrode, and the other is called the other electrode) of a sample-holding capacitance 44 for holding the signal outputted to the vertical selection line CL1 is connected to an output side of the sample-holding switch 42. A reference voltage source 46 is connected to the other electrode side of the sample-holding capacitance 44.

An input terminal of an amplifier 48 constituting the correlated double sampling circuit is connected to a connection point between the sample-holding switch 42 and the one electrode side of the sample-holding capacitance 44. An output terminal of the amplifier 48 is connected to one electrode side of a CDS capacitance 50 of the correlated double sampling circuit, and the other electrode side of the CDS capacitance 50 is connected to an input terminal of an amplifier 54.

The other electrode side of the CDS capacitance 50 is connected to the other electrode side of the sample-holding capacitance 44 through a clamp switch 52. By switching of the clamp switch 52, the other electrode side of the CDS capacitance 50 can be cut off from the reference voltage of the reference voltage source 46 or can be fixed to the reference voltage. An output terminal of the amplifier 54 is connected to the signal common output line 30 through the column selection transistor 20.

Next, the operation of the sample-and-hold circuit and the correlated double sampling circuit will be described with reference to FIG. 2. First, a flow of a signal outputted from the pixel region P11 will be described in brief. When the horizontal selection signal RW1 is inputted to the gate electrode of the horizontal selection transistor 16, a voltage variation of the source follower amplifier 14 corresponding to the electric charge quantity stored in the photodiode 10 of the pixel region P11 is outputted as a signal voltage VS containing the image data to the vertical selection line CL1. Next, the reset signal RST is inputted to the gate electrode of the reset transistor 12 while the horizontal selection transistor 16 maintains the on state, so that the reset transistor 12 is brought into the on state to reset the photodiode 10 to the reset potential VR, and the reset voltage VR is outputted to the vertical selection line CL1. The above operation is carried out in a horizontal blanking period.

In the above flow of the signal, for example, at the timing that the horizontal selection signal RW1 is inputted and the horizontal selection transistor 16 is turned on, the sample-holding switch 42 and the clamp switch 52 are brought into the on state. By this, the signal voltage VS is applied to the input terminal of the sample-and-hold circuit. Since the clamp switch 52 is in the on state, the signal voltage VS charges the sample-holding capacitance 44 of the sample-and-hold circuit and also charges the CDS capacitance 50.

Next, after the clamp switch 52 is turned off, the reset signal RST is inputted to bring the reset transistor 12 into the on state. By this, the photodiode 10 is reset to the reset potential VR, and the reset voltage VR is outputted to the vertical selection line CL1. The reset voltage VR is inputted to the input terminal of the sample-and-hold circuit and is held by the sample-holding capacitance 44.

As a result, a difference signal (VS−VR) corresponding to a difference between the signal voltage VS and the reset voltage VR is generated at the output side of the CDS capacitance 50. This signal is held by the CDS capacitance 50. By doing so, it is possible to obtain the analog image data in which the fixed pattern noise components superimposed on both the signal voltage VS and the reset voltage VR are removed. The analog image data is outputted to the signal common output line 30 from the output terminal of the amplifier 54 through the column selection transistor 20.

In the amplifier/noise cancel circuit 6, the sample-and-hold circuit and the correlated double sampling circuit (hereinafter, a combination of both the circuits is called a CDS circuit) 6CLn are provided to the vertical selection line CLn.

Further, in the amplifier/noise cancel circuit 6 of the embodiment, the kTC noise reduction circuit for reducing the kTC noise in cooperation with the CDS circuit 6CLn is provided for each CDS circuit 6CLn.

Figure 3:
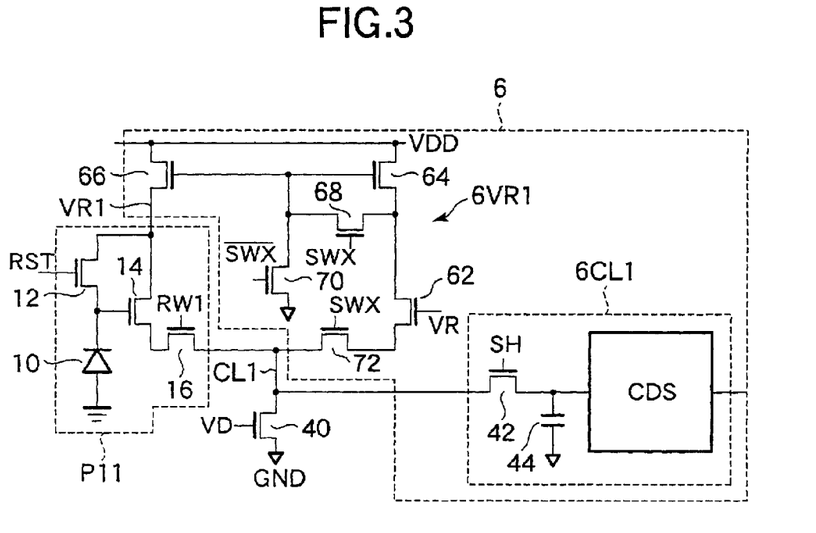
FIG. 3 is a view showing a circuit example of a kTC noise reduction circuit of the CMOS image sensor 1 according to the embodiment of the present invention.

Hereinafter, the kTC noise reduction circuit 6VRn of the embodiment will be described with reference to FIG. 3. The kTC noise reduction circuit 6VRn is characterized in that most of the circuit portion is formed in the amplifier/noise cancel circuit 6, and a part of the circuit structure uses an element in the pixel region Pmn. In FIG. 3, a block indicated by a broken line at the left side in the drawing shows, as an example, the pixel region P11 connected to the vertical selection line CL1. A block indicated by a broken line at the right side in the drawing shows the CDS circuit 6CL1 and a main portion of the kTC noise reduction circuit 6VR1 in the amplifier/noise cancel circuit 6. Incidentally, the correlated double sampling circuit of FIG. 3 is not shown in detail but is shown as one circuit block.

In FIG. 3, a circuit switching transistor 72 having almost the same characteristic as the horizontal selection transistor 16 formed in the pixel region P11 is provided in the amplifier/noise cancel circuit 6, and its source electrode is connected to the vertical selection line CL1. A circuit switching signal SWX is inputted to a gate electrode of the circuit switching transistor 72. The circuit switching signal SWX is outputted in synchronization with the reset signal RST.

A drain electrode of the circuit switching transistor 72 is connected to a source electrode of a first differential transistor 62 having almost the same characteristic as the source follower amplifier 14. A drain electrode of the first differential transistor 62 is connected to one electrode side of a transistor 64 of, for example, a MOS type, and a voltage VDD is applied to the other electrode side of the transistor 64. A reset voltage VR is inputted to a gate electrode of the first differential transistor 62.

On the other hand, drain electrodes of the reset transistor 12 and the source follower amplifier 14 in the pixel region P11 are connected to one electrode side of a transistor 66 of, for example, a MOS type through the reset voltage supply line VR1 to which the reset voltage VR is applied. The voltage VDD is applied to the other electrode side of the transistor 66. The reset voltage supply line VR1 is formed along the vertical selection line CL1 outside of the plurality of pixel regions P11, P21, P31, . . . , and supplies the reset voltage VR to the plurality of reset transistors 12 respectively formed in the pixel regions P11, P21, P31 . . . .

A gate electrode of the transistor 66 and a gate electrode of the transistor 64 are mutually connected. A circuit switching transistor 68 is formed in such a manner that its one electrode side is connected to a connection point between the first differential transistor 72 and the transistor 64 and the other electrode side is connected to the gate electrodes of the transistor 64 and the transistor 66. A circuit switching signal SWX is inputted to a gate electrode of the circuit switching transistor 68. Besides, a circuit switching transistor 70 is formed in such a manner that its one electrode side is connected to the gate electrodes of the transistor 64 and the transistor 66 and the other electrode side is grounded. A circuit switching signal/SWX having a reverse polarity to the circuit switching signal SWX is inputted to a gate electrode of the circuit switching transistor 70.

Here, the horizontal selection transistor 16 of the pixel region P11 and the circuit switching transistors 68 and 72 in the amplifier/noise cancel circuit 6 are turned on, and the circuit switching transistor 70 is turned off, and when the source follower amplifier 14 of the pixel region P11 is regarded as a second differential transistor forming the differential pair to the first differential transistor 62, the above structure of FIG. 3 becomes a differential amplifier provided with a current mirror circuit instead of an additional resistor. The current mirror circuit is constituted by the transistor 64 in which the gate electrode is directly connected to the one electrode side, and the transistor 66 having the other electrode side to which the voltage VDD is applied in addition to the other electrode side of the transistor 64, and the gate electrode mutually connected to the gate electrode of the transistor 64.

The circuit described with reference to FIG. 3 is the circuit structure of the kTC noise reduction circuit 6VR1 of the embodiment, and although not shown, another kTC noise reduction circuit 6VRn also has a similar structure. Like this, in the kTC noise reduction circuit 6VRn, most of the circuit structure is formed in the amplifier/noise cancel circuit 6, and a part of the circuit structure uses the element in the pixel region Pmn.

Next, the operation of reducing the kTC noise will be described using the kTC noise reduction circuit 6VR1 shown in FIG. 3 as an example. First, until the time immediately before the end of the reset period, the horizontal selection transistor 16 and the circuit switching transistors 68 and 72 are in the on state, and the circuit switching transistor 70 is in the off state. Accordingly, the main portion of the kTC noise reduction circuit 6VR1 is electrically connected to the element in the image region P11, and the kTC noise reduction circuit 6VR1 functions as the differential amplifier and is in the state where the kTC noise reduction operation is carried out.

When the reset signal RST falls into an inactive level, the horizontal transistor 16 and the circuit switching transistors 68 and 72 are brought into the off state, and the circuit switching transistor 70 is brought into the on state. By this, the main portion of the kTC noise reduction circuit 6VR1 is electrically separated from the element in the image region P11, and the kTC noise reduction circuit 6VR1 does not function as the differential amplifier and is brought into the state where the kTC noise reduction operation is not carried out. On the other hand, the respective elements in the pixel region P11 carry out the original signal storage operation.

Next, at the timing when the horizontal selection signal RW1 is inputted after a predetermined time has elapsed and the horizontal transistor 16 is brought into the on state, the sample-holding switch 42 and the clamp switch 52 of the CDS circuit 6CL1 are closed, and the signal voltage VS outputted to the vertical selection line CL1 from the source follower amplifier 14 of the pixel region P11 is charged to the sample-holding capacitance 44 and the CDS capacitance 50.

Next, the clamp switch 52 is turned off, the circuit switching transistor 70 is brought into the off state, and the circuit switching transistors 68 and 72 are brought into the on state. By this, the kTC noise reduction circuit 6VR1 again functions as the differential amplifier and is brought into the operation state of the kTC noise reduction. In this state, at the timing when the reset signal RST is applied to the gate electrode of the reset transistor 12 of the pixel region P11, the reset voltage VR is supplied to the gate electrode of the first differential transistor 62.

By this, the output voltage (=reset voltage VR) of the output side transistor 66 of the current mirror circuit of the kTC noise reduction circuit 6VR1 is controlled so that the potential of the photodiode 10 at the cathode side always becomes the reset voltage VR in the period when the reset transistor 12 is in the on state. Like this, the kTC noise reduction circuit 6VR1 functions as an operational amplifier with an amplification factor of 1 at the time of the reset operation.

In that case, the kTC noise generated each time the photodiode 10 is reset is made almost constant, and it is possible to produce a correlation between the signal voltage VS including the kTC noise before the signal storage and the kTC noise superimposed on the reset voltage VR after the signal storage. When the photodiode 10 is reset to the reset voltage VR by using the kTC noise reduction circuit 6VR1, the reset voltage VR is outputted to the vertical selection line CL1. The reset voltage VR is inputted to the input terminal of the sample-and-hold circuit and is held by the sample-holding capacitance 44.

As a result, a difference signal (VS−VR) corresponding to a difference between the signal voltage VS and the reset voltage VR is generated at the output side of the CDS capacitance 50 of the CDS circuit 6CL1. This signal is held by the CDS capacitance 50. By doing so, it is possible to obtain analog image data in which not only the fixed pattern noise components superimposed on both the signal voltage VS and the reset voltage VR, but also the kTC noise is removed. This analog image data is outputted to the signal common output line 30 through the column selection transistor 20 from the output terminal of the amplifier 54.

According to the kTC noise reduction circuit 6VRn of the embodiment, the main portion of the circuit is disposed outside of the pixel region, and the element in the pixel region is used as the part of the circuit structure at the time of the kTC noise reduction operation to construct the circuit, so that the kTC noise can be reduced without lowering the opening ratio of the pixel.

Incidentally, even if the sizes and the like of the first differential transistor 62 and the source follower amplifier 14 forming the differential pair are made uniform to have almost the same characteristics, there is a case where an offset voltage changing in accordance with a wiring distance between both is generated. Further, since the transistor of the source follower amplifier 14 is small, the offset voltage becomes several tens mV. This is not preferable since the reset voltage VR applied to the cathode side of the photodiode 10 becomes different in each of the plurality of pixel regions. If the offset voltage is rather low, it can be removed by the CDS circuit 6CLn disposed at a later stage. However, in order to certainly remove the offset voltage, it is desirable to insert an offset correction circuit surrounded by a broken line of FIG. 4.

Figure 4:
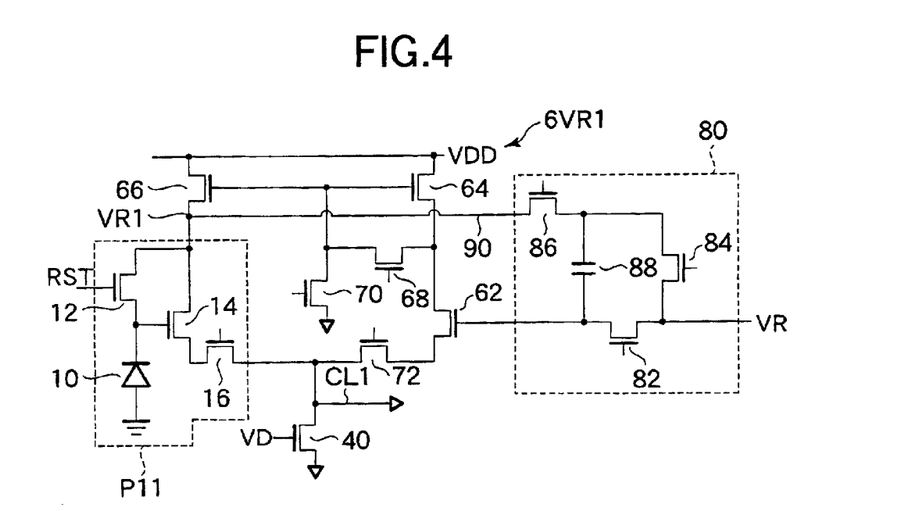
FIG. 4 is a view showing a circuit example of an offset voltage correction circuit of the CMOS image sensor 1 according to the embodiment of the present invention.

FIG. 4 shows an outline of an offset correction circuit 80. A main portion of the offset correction circuit 80 is provided in the amplifier/noise cancel circuit 6. The offset correction circuit 80 includes an offset correcting transistor 82 inserted to an input stage of a reset voltage VR applied to a gate electrode of the first differential transistor 62. One electrode side of the offset correcting transistor 82 is connected to the gate electrode of the first differential transistor 62. Besides, the offset correction circuit 80 includes an offset correcting transistor 86 having one electrode side connected to the reset voltage supply line VR1 to which the controlled reset voltage VR is outputted when the kTC noise reduction circuit 6VR1 functions as the differential amplifier. One electrode side of an offset correcting transistor 84 and one electrode side of an offset correcting capacitance 88 are connected to the other electrode side of the offset correcting transistor 86. The other electrode side of the offset correcting transistor 84 is connected to the other electrode side of the offset correcting transistor 82, and the other electrode side of the offset correcting capacitance 88 is connected to one electrode side of the offset correcting transistor 82 (that is, the gate electrode of the first differential transistor 62).

An offset voltage removing operation by the offset correction circuit 80 having the above structure will be described. First, at the timing when the reset signal RST is applied to the gate electrode of the reset transistor 12, the circuit switching transistors 68, 70 and 72 operate, and the kTC noise reduction circuit 6VR1 functions as the differential amplifier. At the initial stage of the reset period, the offset correcting transistors 82 and 86 are in the on state, and the offset correcting transistor 84 is in the off state. Thus, the reset voltage VR is applied to the gate electrode of the first differential transistor, and a voltage value VR+VO including the offset voltage VO is outputted to the reset voltage supply line VR1 through the differential amplifier. Accordingly, the offset voltage VO is held in the offset correcting capacitance 82.

Next, when the offset correcting transistors 82 and 86 are turned off, and the offset correcting transistor 84 is turned on, a voltage value VR−VO is applied as the reset voltage to the gate electrode of the first differential transistor 62. By this, the desired reset voltage VR is outputted to the reset voltage supply line VR1 through the differential amplifier. This operation is carried out at the initial stage of the reset period. By doing so, it becomes possible to supply the uniform reset voltage VR for each of the pixel regions Pmn.

Figure 5:
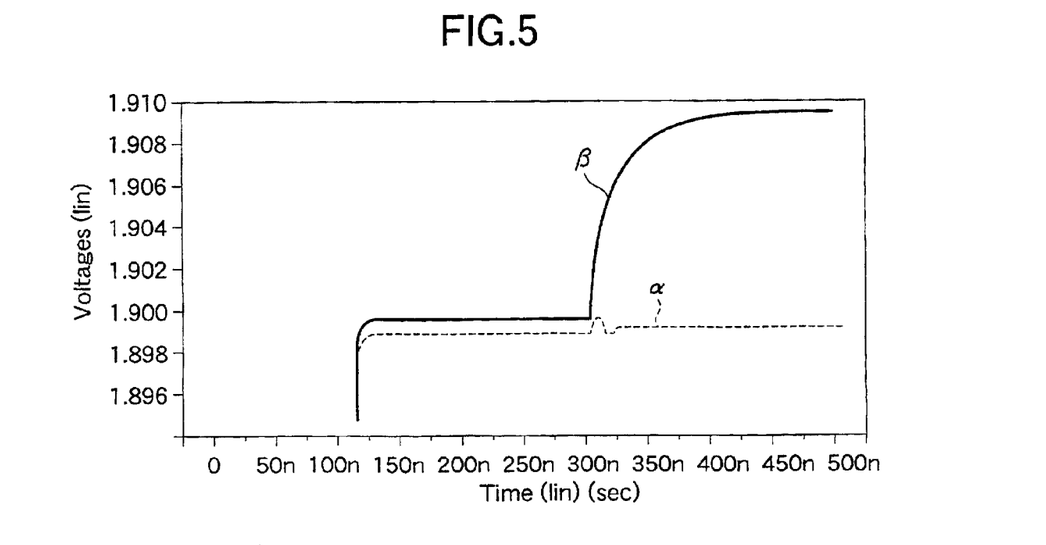
FIG. 5 is a view showing an effect of the CMOS image sensor 1 according to the embodiment of the present invention.

FIG. 5 is a simulation view showing an effect of kTC noise reduction by the X-Y address type solid-state image pickup device of the embodiment, together with a comparative example. In the drawing, the horizontal axis indicates a time, and the vertical axis indicates a voltage value. A broken line a in the drawing is a curve showing the effect of the X-Y address type solid-state image pickup device of the embodiment, and a solid line β is a curve showing a conventional X-Y address type solid-state image pickup device. FIG. 5 shows an output voltage value from the CDS circuit in the case where the reset signal RST is inputted to the reset transistor at the time 120 nsec, and the kTC noise with a DC component of 10 mV is superimposed after about 200 nsec from the time when the potential of the photodiode at the cathode side becomes about 1.9 V. As shown in the drawing, in the conventional X-Y address type solid-state image pickup device, the kTC noise can not be reduced by the CDS circuit, and there appears a noise component of about 10 mV which is almost equal to the level of the superimposed kTC noise. On the other hand, in the X-Y address type solid-state image pickup device of the embodiment, a variation of an output voltage value from the CDS circuit is merely about 0.25 mV, and an extremely superior kTC noise reduction effect can be obtained.

As described above, according to the present invention, it is possible to realize the X-Y address type solid-state image pickup device which has a small element size and a wide opening ratio, and can reduce the kTC noise.

What is claimed is:

1. An image sensor in which a gate of source follower transistor is connected to one end of a photoelectric transducer, and a potential at the one end of the photoelectric transducer is read out as image data through the source follower transistor, the image sensor characterized in that at a time of reset of the photoelectric transducer, a differential amplifier is constructed in which an inverting input terminal is the gate of the source follower transistor, and a noninverting input terminal is a gate of a first differential transistor to which a constant voltage is applied, and the one end of the photoelectric transducer is kept the constant voltage by feeding back an output of the differential amplifier to the inverting input terminal.

2. An image sensor according to claim 1, characterized in that the output of the differential amplifier is fed back to the inverting input terminal through a reset transistor for resetting the photoelectric transducer.

3. An image sensor according to claim 2, characterized in that the photoelectric transducer, the source follower transistor, and the reset transistor constitute a pixel, and a plurality of such pixels are arranged in a matrix form.

4. An image sensor according to claim 3, characterized in that outputs of the plurality of the pixels are connected in common to one vertical selection line, and the image data of the respective pixels are read out through the vertical selection line.

5. An image sensor according to claim 4, characterized in that the first differential transistor constituting the differential amplifier is provided for each of the vertical selection lines.

6. An image sensor according to claim 5, characterized in that the first differential transistor is connected to the vertical selection line through a circuit switching transistor which is turned on in synchronization with an on operation of the reset transistor.

7. An image sensor according to claim 6, characterized in that reset transistors of the plurality of the pixels are connected in common to one reset voltage supply line.

8. An image sensor according to claim 7, characterized in that the differential amplifier includes a current mirror circuit, and the current mirror circuit is provided for each of a plurality of such reset voltage supply lines, and supplies the output of the differential amplifier to each of the plurality of the reset transistors connected in common to the reset voltage supply line.

9. An image sensor according to claim 8, characterized in that the vertical selection line and the reset voltage supply line form a pair and are disposed in parallel with each other.

* * * * *